United States Patent [19]
Yang

[11] Patent Number: 6,091,542
[45] Date of Patent: Jul. 18, 2000

[54] OPTICAL FIBER AMPLIFIER FOR AMPLIFYING SIGNAL LIGHTS PROPAGATING IN TWO OPPOSITE DIRECTIONS

[75] Inventor: Tae Su Yang, Incheon, Rep. of Korea

[73] Assignee: Daewoo Telecom Ltd., Incheon, Rep. of Korea

[21] Appl. No.: 09/179,892

[22] Filed: Oct. 28, 1998

[30] Foreign Application Priority Data

Oct. 29, 1997 [KR] Rep. of Korea ........................ 97-56034

[51] Int. Cl.$^7$ ...................................................... H01S 03/00
[52] U.S. Cl. ............................................ 359/341; 359/173
[58] Field of Search .................................. 359/341, 154, 359/133, 134, 173

[56] References Cited

U.S. PATENT DOCUMENTS

| | | | |
|---|---|---|---|
| 5,365,368 | 11/1994 | Hsu et al. ................................. | 359/341 |
| 5,452,124 | 9/1995 | Baker ....................................... | 359/341 |
| 5,801,858 | 9/1998 | Roberts et al. .......................... | 359/114 |
| 5,815,308 | 9/1998 | Kim et al. ................................ | 359/341 |

*Primary Examiner*—Mark Hellner
*Attorney, Agent, or Firm*—Bacon & Thomas, PLLC

[57] ABSTRACT

An optical amplifier for amplifying signal lights propagating in two opposite directions comprises a 1st and a 2nd transmitters for generating a 1st and a 2nd signal lights, respectively, a 1st and a 2nd receivers for receiving the 1st and the 2nd signal lights, respectively, a fiber amplifier for amplifying the signal lights, a 1st optical device including a 1st and a 2nd wavelength division multiplexing(WDM) couplers, a 1st and a 2nd isolators, a 2nd optical device including a 3rd and a 4th WDM couplers, a 3rd and a 4th isolators and a pair of light sources for pumping the fiber amplifier. In the optical amplifier, the 1st WDM coupler selectively transmits the 1st signal light from the 1st transmitter to the fiber amplifier via the 1st isolator and the 2nd WDM coupler, and the 2nd WDM coupler selectively transmits the 2nd signal light from the 2nd transmitter to the 2nd receiver via the 2nd isolator and the 1st WDM coupler. The 3rd WDM coupler selectively transmits the 1st signal light from the fiber amplifier to the 1st receiver via the 3rd isolator and the 4th WDM coupler, and the 4th WDM coupler selectively transmits the 2nd signal light from the 2nd transmitter to the fiber amplifier via the 4th isolator and the 3rd WDM coupler.

12 Claims, 2 Drawing Sheets

OPTICAL FIBER AMPLIFIER FOR AMPLIFYING SIGNAL LIGHTS PROPAGATING IN TWO OPPOSITE DIRECTIONS

FIELD OF THE INVENTION

The present invention relates to an optical amplifier; and, more particularly, to an improved optical fiber amplifier for transmitting or amplifying signal lights propagating in two opposite directions.

DESCRIPTION OF THE PRIOR ART

Recent development of optical communication technologies using optical fibers has achieved a high rate of data transmission performance at a relatively low cost. However, demands for transmitting or amplifying signal lights in two directions have also been increasing in the optical communications due to the rapid increase in the amount of data to be transmitted. Therefore, various types of bidirectional optical amplifiers utilizing optical fibers have been recently developed to meet the requirements.

In FIG. 1, there is illustrated a prior art bidirectional optical amplifier 100 utilizing a four port optical circulator, as disclosed in U.S. Pat. No. 5,548,438, entitled "Bidirectional Optical Amplifier". The optical amplifier 100 comprises a circulator 110 having four ports A, B, C and D, a first and a second fiber amplifiers 122, 128, a multiflexer 130, a first and a second lasers 140, 142 and an isolator 124. In the optical amplifier 100, an upstream signal enters the port A of the optical circulator 110 and exits at the port D of the optical circulator 110 after being amplified by both fiber amplifiers 122, 128. The upstream signal from the port B is amplified by the first fiber amplifier 122, wherein the first laser 140 pumps the first fiber amplifier 122 so that it functions as a preamplifier with a low noise figure and some gain. The preamplified upstream signal arrives at the isolator 124 which is capable of eliminating an amplified spontaneous emission(ASE) propagating opposite to the direction of the preamplified upstream signal.

The upstream signal passing through the isolator 124 is transmitted to the second fiber amplifier 128. The second laser 142 pumps the second fiber amplifier 128, thereby making the second fiber amplifier 128 serve as a power booster with high output power. The amplified upstream signal enters the port C of the optical circulator 110 and exits at the port D of the optical circulator 110, so that the upstream signal is amplified by using both fiber amplifiers 122, 128.

On the other hand, a downstream signal travels from the port D to the port A of the optical circulator 110 without being amplified by neither of the fiber amplifiers 122, 128.

One of the major shortcomings of the above-described bidirectional optical amplifier is that it requires additional fiber amplifiers to amplify the downstream signal.

SUMMARY OF THE INVENTION

It is, therefore, a primary object of the present invention to provide an optical amplifier capable of amplifying signal lights propagating in two opposite directions by using one fiber amplifier.

In accordance with the present invention, there is provided an optical amplifier for amplifying signals in two directions, comprising: a first and a second transmitters for generating a first and a second signal lights, respectively; a first and a second receivers for receiving the first and the second signal lights, respectively; a fiber amplifier for amplifying the first and the second signal lights; a first optical device provided with a first and a second wavelength division multiplexing(WDM) couplers, a first and a second isolators, wherein the first WDM coupler selectively transmits the first signal light from the first transmitter to the fiber amplifier via the first isolator and the second WDM coupler, and the second WDM coupler selectively transmits the second signal light from the second transmitter to the second receiver via the second isolator and the first WDM coupler; a second optical device provided with a third and a fourth WDM couplers, a third and a fourth isolators, wherein the third WDM coupler selectively transmits the first signal light from the fiber amplifier to the first receiver via the third isolator and the fourth WDM coupler, and the fourth WDM coupler selectively transmits the second signal light from the second transmitter to the fiber amplifier via the fourth isolator and the third WDM coupler; and a pair of light sources for pumping the fiber amplifier.

BRIEF DESCRIPTION OF THE DRAWINGS

The above and other objects and features of the present invention will become apparent from the following description of preferred embodiments, when given in conjunction with the accompanying drawings, wherein.

DETAILED DESCRIPTION OF THE PREFERRED EMBODIMENTS

Figure 1:
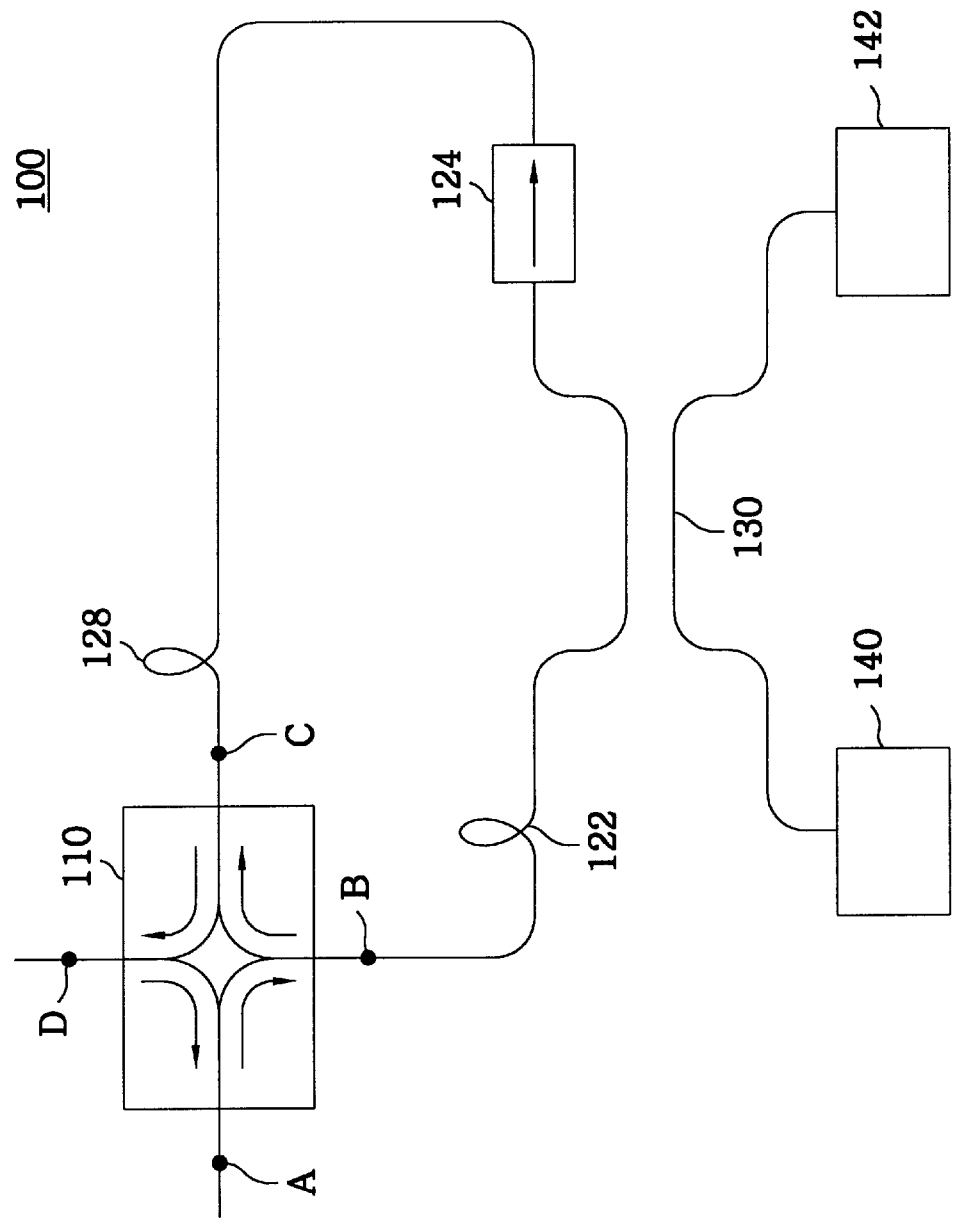
FIG. 1 is a schematic representation of the prior art bidirectional optical amplifier.
Figure 2:
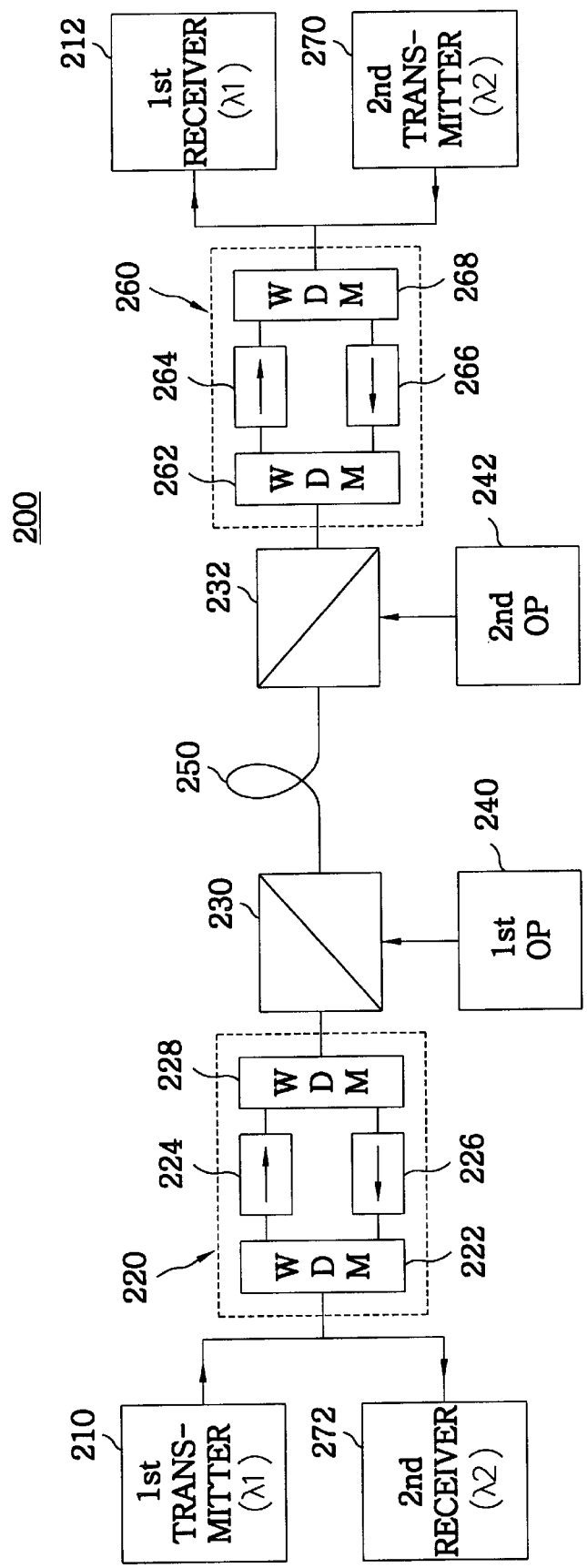
FIG. 2 presents a schematic illustration of the inventive optical amplifier for amplifying signal lights propagating in two opposite directions.

Referring to FIG. 2, there is shown a schematic illustration of an optical fiber amplifier 200 for amplifying signal lights propagating in two opposite directions in accordance with a preferred embodiment of the present invention.

The optical amplifier 200 comprises a first and a second transmitters 210, 270, a first and a second receivers 212, 272, a first and a second optical device 220, 260, a first and a second optical couplers 230, 232, a first and a second optical pumps 240, 242 for emitting a first and a second pumping lights, respectively, and a fiber amplifier 250, wherein the first optical device 220 includes a first and a second wavelength division multiplexing(WDM) couplers 222, 228 and a first and a second isolators 224, 226, and the second optical device 260 includes a third and a fourth WDM couplers 262, 268 and a third and a fourth isolators 264, 266. The fiber amplifier 250 is made of an optical fiber which is doped with dopants such as erbium(Er) ions or praseodymium(Pr) ions. It should be noted that the fiber amplifier 250 could be made of an optical fiber doped with other rare-earth dopant.

In the optical amplifier 200, the first transmitter 210, e.g., a distributed feed back(DFB) laser, generates a first signal light having a wavelength $\lambda_1$, e.g., 1530 nm. When the first signal light enters the first optical device 220, the first WDM coupler 222 sends the first signal light to the first isolator 224 which transmits the first signal light to the second WDM coupler 228. While a signal light from the first WDM coupler 222 is transmitted to the second WDM coupler 228 by the first isolator 224, a signal light from the second WDM coupler 228 is not transmitted to the first WDM coupler 222 by the first isolator 224. Therefore, the first isolator 224 is capable of eliminating amplified spontaneous emission (ASE) propagating opposite to the direction of the first signal light.

The second WDM coupler 228 of the first optical device 220 transmits the first signal light from the first isolator 224 to the first optical coupler 230 which transmits the first signal light from the second WDM coupler 228 to the fiber amplifier 250. In the meantime, the 1st optical pump(OP) 240, e.g., a semiconductor laser, generates a first pumping light which is sent to the fiber amplifier 250 by the first optical coupler 230 so that the fiber amplifier 250 acts as a preamplifier for the first signal light, wherein the first optical coupler 230 couples the first signal light with the first pumping light. The first optical coupler 230 is disposed between the first optical device 220 and the fiber amplifier 250. If the fiber amplifier 250 is made of an erbium doped fiber, 1550 nm light bands and 980 nm light band may be used for the signal lights and the first pumping light, respectively.

The first preamplified signal light is then transmitted to the second optical device 260 through the second optical coupler 232. In the mean time, the 2nd OP 242, e.g., a semiconductor laser, emits a second pumping light and sends the second pumping light to the fiber amplifier 250 to boost the first preamplified signal light. The second optical coupler 232 couples the second pumping light with the first preamplified signal light. The second optical coupler 232 is disposed between the fiber amplifier 250 and the second optical device 260. In the first preferred embodiment of the present invention, if the fiber amplifier 250 is made of an erbium doped fiber, 1480 nm band light can be used as the second pumping light to pump the fiber amplifier 250. The boosted first signal light enters the third WDM coupler 262 which transmits the boosted first signal light to the third isolator 264 of the second optical device 260. The boosted first signal light goes therefrom to the first receiver 212 through the fourth WDM coupler 268.

On the other hand, the second transmitter 270, e.g., a DFB laser, generates a second signal light having a wavelength $\lambda_2$, e.g., 1560 nm. When the second signal light enters the fourth WDM coupler 268 of the second optical device 260, the fourth WDM coupler 268 sends the second signal light to the fourth isolator 266 which transmits the second signal light to the third WDM coupler 262. While a signal light from the fourth WDM coupler 268 is transmitted to the third WDM coupler 262 by the fourth isolator 266, a signal light from the third WDM coupler 262 is not transmitted to the fourth WDM coupler 268 by the fourth isolator 266. Therefore, the fourth isolator 266 is capable of eliminating ASE propagating opposite to the direction of the second signal light.

The third WDM coupler 262 of the second optical device 260 transmits the second signal light from the fourth isolator 266 to the second optical coupler 232 which transmits the second signal light from the third WDM coupler 262 to the fiber amplifier 250. In the meantime, the second pumping light from the second OP 242 is sent to the fiber amplifier 250 through the second optical coupler 232 so that the fiber amplifier 250 acts as a preamplifier for the second signal light to thereby obtain a second preamplified signal light, wherein the second optical coupler 232 couples the second signal light with the second pumping light.

The 1st OP 240 boosts the fiber amplifier 250 to thereby produce a boosted second signal light, wherein the first optical coupler 230 couples the first pumping light with the second preamplified signal light. The boosted second signal light enters the second WDM coupler 228 which transmits the boosted second signal light to the second isolator 226 of the first optical device 220. The boosted second signal light then goes therefrom to the second receiver 272 through the first WDM coupler 222.

Other optical components such as an optical filter (not-shown) may be incorporated into the optical amplifier 200 to improve the noise to signal ratio thereof.

In comparison with the prior art bidirectional optical amplifier 100, the inventive optical amplifier 200 is capable of amplifying signal lights propagating in two opposite directions. This is achieved by incorporating therein a pair of optical devices 220, 260, thereby eliminating an additional fiber amplifier needed to amplify a downstream light signal in the prior art bidirectional optical amplifier 100.

While the present invention has been described with respect to certain preferred embodiments only, other modifications and variations may be made without departing from the scope and spirit of the present invention as set forth in the following claims.

What is claimed is:

1. An optical amplifier for amplifying signal lights propagating in two opposite directions, the optical amplifier comprising:

a first and a second transmitters for generating a first and a second signal lights, respectively;

a first and a second receivers for receiving the first and the second signal lights, respectively;

a fiber amplifier for amplifying the first and the second signal lights;

a first optical device including a first and a second wavelength division multiplexing(WDM) couplers, a first and a second isolators, wherein the first WDM coupler selectively transmits the first signal light from the first transmitter to the fiber amplifier via the first isolator and the second WDM coupler, and the second WDM coupler selectively transmits the second signal light from the second transmitter to the second receiver via the second isolator and the first WDM coupler;

a second optical device including a third and a fourth WDM couplers, a third and a fourth isolators, wherein the third WDM coupler selectively transmits the first signal light from the fiber amplifier to the first receiver via the third isolator and the fourth WDM coupler, and the fourth WDM coupler selectively transmits the second signal light from the second transmitter to the fiber amplifier via the fourth isolator and the third WDM coupler; and means for pumping the fiber amplifier.

2. The optical amplifier of claim 1, wherein the pumping means includes a light source for generating a pumping light and means for coupling the pumping light with the signal lights.

3. The optical amplifier of claim 1, wherein the pumping means includes a first and a second light sources for generating pumping lights and a first and a second optical couplers for coupling the pumping lights with the signal lights, respectively.

4. The optical amplifier of claim 3, wherein the first optical coupler is disposed between the first optical device and the fiber amplifier and the second optical coupler is disposed between the fiber amplifier and the second optical device.

5. The optical amplifier of claim 4, wherein the fiber amplifier is made by being doped with erbium ions.

6. The optical amplifier of claim 5, wherein the signal light beams are of 1550 nm band lights.

7. The optical amplifier of claim 6, wherein the first pumping light is of 980 nm band light.

8. The optical amplifier of claim 6, wherein the second pumping light is of 1480 nm band light.

9. The optical amplifier of claim 8, wherein, if the first signal light enters the fiber amplifier, the first light source pumps the fiber amplifier so that the fiber amplifier serves as a preamplifier.

10. The optical amplifier of claim 9, wherein the second light source pumps the fiber amplifier so that the fiber amplifier acts as a booster amplifier.

11. The optical amplifier of claim 9, wherein, if the second signal light enters the fiber amplifier, the second light source pumps the fiber amplifier so that the fiber amplifier serves as a preamplifier.

12. The optical amplifier of claim 11, wherein the first light source pumps the fiber amplifier so that the fiber amplifier acts as a booster amplifier.

* * * * *